United States Patent
Cho et al.

(10) Patent No.: US 9,288,880 B2
(45) Date of Patent: Mar. 15, 2016

(54) SMART HOME NETWORK APPARATUS AND CONTROL METHOD THEREOF

(71) Applicant: Samsung Electronics Co., Ltd., Suwon (KR)

(72) Inventors: Young-Hoon Cho, Suwon (KR); Tae-Hyeun Ha, Suwon (KR); Tae-Hoon Kim, Suwon (KR); Chang-Won Son, Suwon (KR); Tae-Je Park, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/509,143

(22) Filed: Oct. 8, 2014

(65) Prior Publication Data
US 2015/0115834 A1    Apr. 30, 2015

(30) Foreign Application Priority Data
Oct. 30, 2013    (KR) .................. 10-2013-0129831

(51) Int. Cl.
| | |
|---|---|
| *H01J 1/60* | (2006.01) |
| *H01J 7/42* | (2006.01) |
| *H05B 37/04* | (2006.01) |
| *H05B 37/02* | (2006.01) |

(52) U.S. Cl.
CPC ........ *H05B 37/0227* (2013.01); *H05B 37/0272* (2013.01)

(58) Field of Classification Search
None
See application file for complete search history.

(56) References Cited

U.S. PATENT DOCUMENTS

| | | | | |
|---|---|---|---|---|
| 2013/0049607 A1* | 2/2013 | Urata | ............................ | 315/153 |
| 2014/0313006 A1* | 10/2014 | Mason et al. | .................. | 340/4.4 |

* cited by examiner

*Primary Examiner* — Anh Tran
(74) *Attorney, Agent, or Firm* — Staas & Halsey LLP

(57) ABSTRACT

A network apparatus is provided. The network apparatus includes a communication unit configured to perform communication with at least one device. The apparatus also includes a storage unit configured to store information for an illumination device located within a preset distance range from the at least one device. The apparatus further includes a controller configured to control a light-emitting state of the illumination device located within the preset distance range from the at least one device based on the information stored in the storage unit when a preset event occurs in the at least one device.

19 Claims, 13 Drawing Sheets

100

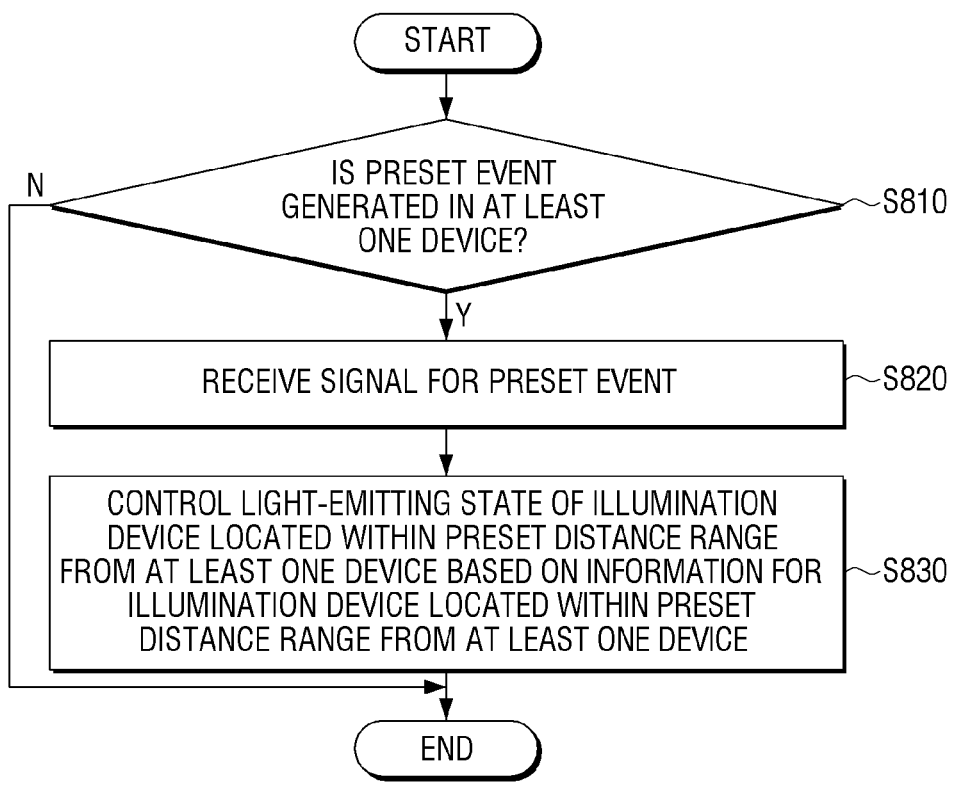

SMART HOME NETWORK APPARATUS AND CONTROL METHOD THEREOF

CROSS-REFERENCE TO RELATED APPLICATIONS

This application claims priority from Korean Patent Application No. 10-2013-0129831, filed on Oct. 30, 2013, in the Korean Intellectual Property Office, the disclosure of which is incorporated herein by reference in its entirety.

BACKGROUND

1. Field

Apparatuses and methods consistent with exemplary embodiments relate to a network apparatus and a control method thereof and, more particularly, to a network apparatus capable of controlling a device on a home network, and a control method thereof.

2. Description of the Related Art

In general, home network systems are network systems which enable intelligent communication by performing network matching between a home network installed in a home and an external communication network. Sharing of information sources and utility of individual products in a smart home may be maximized through home networking.

Home devices configured to constitute a home network include information-based devices, such as a personal computer (PC), a facsimile, a scanner, or a printer, audio/video (A/V) devices, such as a television (TV), a settop box, a digital versatile disc (DVD), a video cassette recorder (VCR), an audio, a camcorder, or a home game machine, control-based devices, such as a coffee machine, an electronic rice cooker, a refrigerator, a washing machine, a microwave oven, or a camera, other devices, such as a remote controller, an intercom, a sensor, or a light, or the like.

Nowadays, portable devices, such as a tablet or a cell phone, which are portable and usable by a user are incorporated into the home network systems, and the home devices and the portable devices may be controlled using the home network systems. The home devices and the portable devices are connected to sub networks, such as a phone line, a wireless local area network (LAN), Bluetooth, a universal serial bus (USB), Institute of Electrical and Electronics Engineers (IEEE) 1394 interface, or a power line.

Therefore, there is a need for a method of notifying a user of operation states of devices in the home network systems through more simple method to improve efficiency of the home network systems in that various devices may construct the home network systems.

SUMMARY

Additional aspects and/or advantages will be set forth in part in the description which follows and, in part, will be apparent from the description, or may be learned by practice of the embodiments.

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a network apparatus capable of notifying a user of occurrence of a specific event in a device of a network system, and a control method thereof.

According to an aspect of an exemplary embodiment, there is provided a network apparatus. The network apparatus may include: a communication unit configured to perform communication with at least one device; a storage unit configured to store information for an illumination device located within a preset distance range from the at least one device; and a controller configured to control a light-emitting state of the illumination device located within the preset distance range from the at least one device based on the information stored in the storage unit when a preset event occurs in the at least one device.

The controller may differently control the light-emitting state of the illumination device according to the at least one device.

The controller may differently control the light-emitting state of the illumination device according to a state of the at least one device.

The network apparatus may further include a second communication unit configured to perform communication with a user terminal apparatus configured to control the at least one device. The controller may transmit information for the preset event to the user terminal apparatus, and control a state of the at least one device according to a control signal received from the user terminal apparatus.

The network apparatus may be a home network apparatus configured to provide home network service.

According to an aspect of an exemplary embodiment, there is provided a method of controlling a network apparatus. The method may include: receiving a signal for a preset event when the preset event occurs in at least one device; and controlling a light-emitting state of an illumination device located within a preset distance range from the at least one device based on information for the illumination device located within the preset distance range from the at least one device when the signal for the preset event is received.

The controlling may include differently controlling the light-emitting state of the illumination device according to the at least one device.

The controlling may include differently controlling the light-emitting state of the illumination device according to a state of the at least one device.

The method may further include transmitting information for the preset event to a user terminal apparatus when the signal for the preset event is received; and controlling a state of the at least one device according to a control signal received from the user terminal apparatus.

The network apparatus may be a home network apparatus configured to provide home network service.

According to the above-described various exemplary embodiments, a network apparatus notifies a user of an operation state of a device in a network system to improve convenience of the user.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 8 is a flowchart illustrating a control method of a network apparatus according to an exemplary embodiment.

DETAILED DESCRIPTION

Figure 1A:
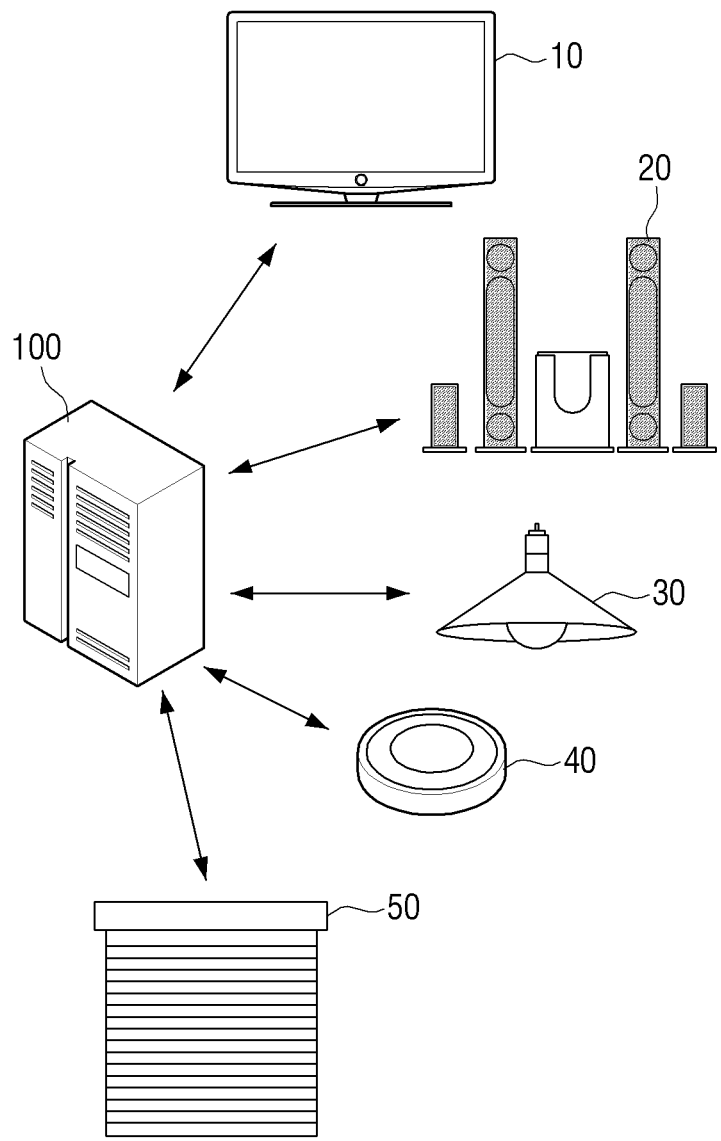
FIGS. 1A and 1B are views illustrating network systems according to various exemplary embodiments.

Reference will now be made in detail to the embodiments, examples of which are illustrated in the accompanying drawings, wherein like reference numerals refer to the like elements throughout. The embodiments are described below by referring to the figures.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1A is a view illustrating a network system according to an exemplary embodiment. Referring to FIG. 1A, a home network system 1000 may be constructed of a network apparatus 100, and a plurality of devices 10 to 50.

The network system 1000 may be implemented with a bi-directionally communicable home network system in which all electrical and electronic products used in the home are connected by one wireless/wired system, but the system is not limited thereto, and any system which connects a plurality of devices through a network and controls the devices may be applied thereto. For example, a system which connects devices in a company through a network and controls the devices may be included therein.

The network apparatus 100 is implemented with a gateway apparatus, a network server, a controller apparatus, or the like, and controls overall operations of a plurality of devices in the network system. That is, the network apparatus 100 may control operations of devices which are in communicable state therewith. For example, the network apparatus 100 may be implemented with a home server, a cloud server, a home controller, a home gateway, or the like, all having a processor.

The network apparatus 100 may automatically control at least one device based on a received user command or according to a state of the device.

For example, when the network system 1000 is constructed as illustrated in FIG. 1A, the network apparatus 200 may store control commands which control various functions which may be provided from a smart TV 10, a home theater 20, a light 30, a robot cleaner 40, and a window blind 50, and transmit the control command to each device. More specifically, the network apparatus 100 may control an ON/OFF state of the light 30.

A plurality of devices 10 to 50 may be implemented with various devices which may construct a home network system. For example, as illustrated in FIG. 1A, the devices 10 to 50 may be implemented with the smart TV 10, the home theater 20, the light 30, the robot cleaner 40, and the blinder 50. However, this is merely exemplary, and the devices may be implemented with other various forms, such as an air conditioner, a heater, a refrigerator, a washing machine, an air cleaner, a monitor, a DVD player, a smart phone, a digital camera, or an electronic picture frame.

Figure 1B:
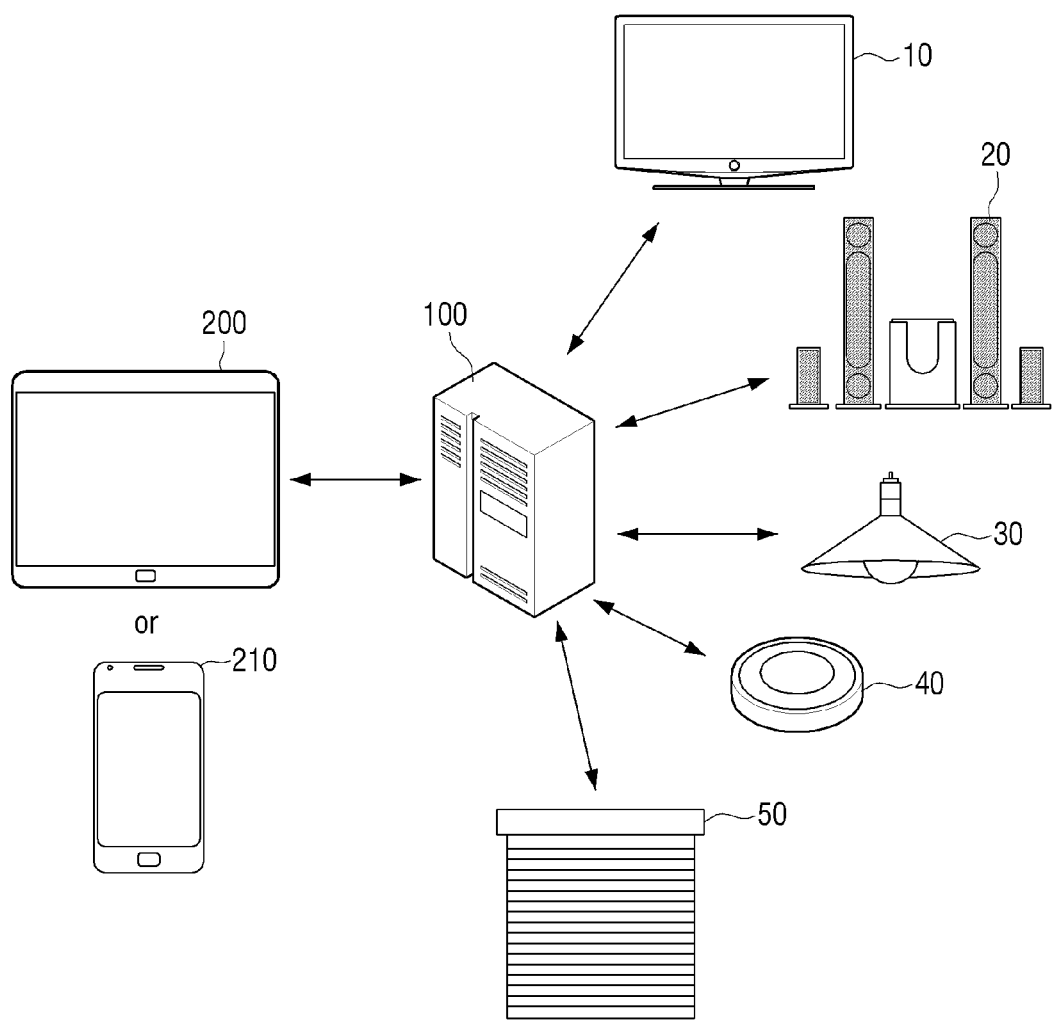

FIG. 1B is a view illustrating a network system according to an exemplary embodiment. Referring to FIG. 1B, a network system 1000 may be constructed of a network apparatus 100, a user terminal apparatus 200, and a plurality of devices 10 to 50.

The network apparatus 100 and the plurality of devices 10 to 50 among the components illustrated in FIG. 1B have been described in FIG. 1A, and thus detailed description thereof will be omitted. In the exemplary embodiment of FIG. 1B, the network apparatus 100 may generate a control command for controlling at least one device among the plurality of devices 10 to 50 based on a user command received from the user terminal apparatus 200, and transmit the generated control command to the at least one device.

The network apparatus 100 may store the control command corresponding to the user command to control the at least one device based on the received user command.

For example, when the network system 1000 is constructed as illustrated in FIG. 1B, the network apparatus 100 may store control commands for controlling various functions which may be provided from a smart TV 10, a home theater 20, a light 30, a robot cleaner 40, and a window blind 50, and transmit the control command corresponding to the user command to a corresponding device. As a more specific example, when a user command for changing a volume of the home theater 20 is received from the user terminal apparatus 200, the network apparatus 100 may transmit a control command for changing the volume of the home theater 20 corresponding to the user command among pre-stored control commands to the home theater 20.

The user terminal apparatus 200 or 210 receives a user command for controlling the devices in the network system 1000, and transmit the received user command to the network apparatus 100. To this end, the user terminal apparatus 200 or 210 may display a UI (User Interface) configured to receive the user command. An item constituting the UI may be variously changed according to the user command received from the user terminal apparatus 200, kinds of the plurality of devices 10 to 50 connected to the network apparatus 100 to constitute the network, or the like, and detailed description thereof will be described later with reference to the accompanying drawings.

The user terminal apparatus 200 or 210 configured to perform the above-described function may be implemented with various electronic apparatuses which are communicable with other apparatuses such as a smart phone, a tablet, a portable multimedia player (PMP), a smart TV, or a PC, and have a display function.

The user terminal apparatus 200 or 210 and the devices 10 to 50 may perform communication with the network apparatus 100 using various communication methods to construct the network system. For example, the user terminal apparatus 200 and the devices 10 to 50 may construct the network system according to a universal plug and play (UPnP) protocol with the network apparatus 100 using a wired/wireless LAN, a wide area network (WAN), Ethernet, Bluetooth, Zigbee, a USB, IEEE 1394, WIFI, or power line communication (PLC).

The user terminal apparatus 200 or 210 is disposed in a home together with the plurality of devices 10 to 50 in FIG. 1B, but the user terminal apparatus 200 may be disposed or located out of a home. That is, the user may control operations of the plurality of devices 10 to 50 using the user terminal apparatus 200 in the home, or may control the operations of the plurality of devices 10 to 50 using the user terminal apparatus 200 out of the home or remote from the home. For example, the user may control a vehicle or the like provided out of the home.

Figure 2A:
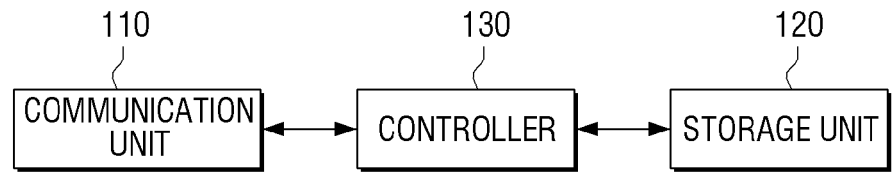
FIG. 2A is a block diagram illustrating a configuration of a network apparatus according to an exemplary embodiment.

FIG. 2A is a block diagram illustrating a configuration of a network apparatus according to an exemplary embodiment. Referring to FIG. 2A, the network apparatus 100 includes a communication unit 110, a storage unit 120, and a controller 130.

The communication unit 110 performs communication with at least one device. Specifically, the communication unit 110 may perform communication with the at least one device constituting a network system.

The storage unit 120 stores information for an illumination device located within a preset distance range from the at least one device.

Specifically, the storage unit 120 may store information for a first illumination device located within a preset distance range from a first device, for example, a refrigerator, information for a second illumination device located within a preset distance range from a second device, for example, a microwave oven, and information for a third illumination device located within a preset distance range from a third device, for example, a washing machine. Here, 'within the preset distance range' may not be set to default, and may be differently set according to the devices. For example, the illumination device located within the preset distance range from each device may be an illumination device located closest to each device. The information for an illumination device may be arbitrary identification information that may identify the illumination device, but is not limited thereto, and the information for the illumination device may include an identification number of the illumination device, for example, a unique product number, or the like. For example, any information in which the network apparatus may identify an illumination device such as a main illumination of a living room, an auxiliary illumination of the living room, or an illumination of a main room may be applied thereto.

The storage unit 120 may store light-emitting pattern information for each device, light-emitting pattern information for an event of each device, or the like.

To this end, the storage unit 120 may include at least one type of storage medium among a flash memory type, a hard disc type, a multimedia card micro type, a card type memory (for example, a secure digital (SD) memory or an extended (XD) memory, or the like), a read only memory (ROM), and a random access memory (RAM).

The controller 130 controls an overall operation of the network apparatus 100.

In particular, when a preset event occurs in at least one device disposed in the network system, the controller 130 controls a light-emitting state of an illumination device located within a preset distance range from the at least one device in which the event occurs, based on information stored in the storage unit 120. The light-emitting state of the illumination device may include various states such as a light-emitting pattern, light-emitting color, or the like of the illumination device. Therefore, the network apparatus 100 may provide a notification function with respect to the operation states of the devices disposed in the network system through an emergency illumination device.

For example, when a preset event occurs in the first device, for example, a refrigerator, the controller 130 may control a first illumination device corresponding to the refrigerator to emit light in a first light-emitting pattern based on the information stored in the storage unit 120.

Further, the controller 130 may differently control a light-emitting state of a corresponding illumination device according to the at least one device. Specifically, when the illumination devices corresponding to the first and second devices are the same, the controller 130 may control the light-emitting state to a first light-emitting pattern when a preset event occurs in the first device, and the controller may control the light-emitting state to a second light-emitting pattern when a preset event occurs in the second device. For example, when an event in which a door of a refrigerator is opened over a preset time occurs or has remained open for longer than a present time period, the controller 130 may control the light-emitting state so that a corresponding illumination device flicks at fast speed. When an event where an operation of a microwave oven is completed occurs, the controller 130 may control the light-emitting state so that a corresponding illumination device flickers at a low speed.

The controller 130 may differently control a light-emitting state of a corresponding illumination device according to a state of the at least one device. Specifically, when a first event occurs in the first device, the controller 130 may control the light-emitting state so that a corresponding illumination device operates in the first light-emitting pattern. When a second event occurs in the first device, the controller 130 may control the light-emitting state so that the corresponding illumination device operates in the second light-emitting pattern. For example, when an event in which a door of a refrigerator is opened over a preset time occurs, the controller 130 may control the light-emitting state so that a corresponding illumination device flickers at fast speed. When an event in which power of the refrigerator turns off occurs, the controller 130 may control the light-emitting state so that the corresponding illumination device flickers at low speed.

Therefore, when an operation of a device in the network system is abnormal, the user may easily recognize the abnormal state based on the change in illumination.

Figure 2B:
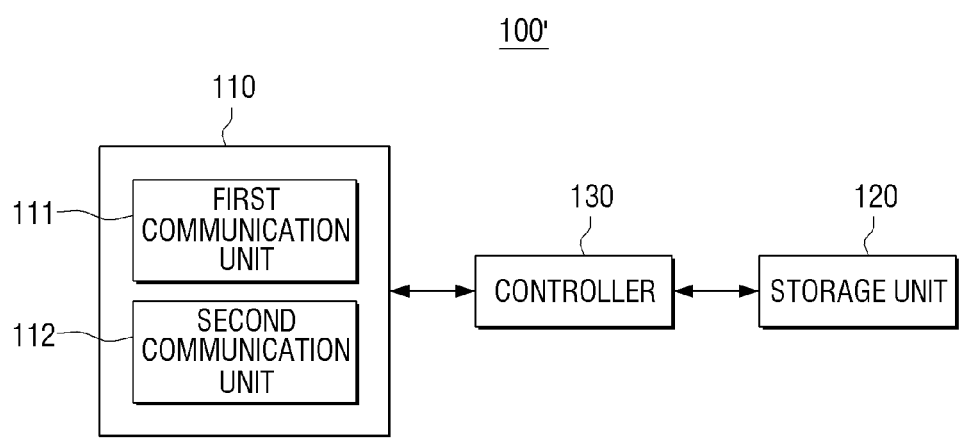
FIG. 2B is a block diagram illustrating a configuration of a network apparatus according to another exemplary embodiment.

FIG. 2B is a block diagram illustrating a configuration of a network apparatus according to another exemplary embodiment.

Referring to FIG. 2B, a network apparatus 100' includes a communication unit 110, a storage unit 120, and a controller 130, and the communication unit 110 includes a first communication unit 111 and a second communication unit 112. A function of the first communication unit 111 is the same as that of the communication unit 110 illustrated in FIG. 2A, and thus detailed description will be omitted.

The second communication unit 112 may receive a user command for controlling at last one device from the user terminal apparatus 200 or 210, and transmit a control command corresponding to the received user command to the at least one device in the network system.

Further, the second communication unit 112 may perform communication with the devices in the network system, and receive information for each device, for example, information for a kind, a name, a unique product number, or the like of each device from each device.

The second communication unit 112 may receive information for a setting state of each device, and the information for the received setting state of each device may be used to generate a UI provided from the user terminal apparatus 200 or 210.

The above-described exemplary embodiment has described that the second communication unit 112 is separately configured from the first communication unit 111. In some embodiments, the first communication unit 111 and the second communication unit 112 may be implemented as one communication unit.

The controller 130 may transmit information for a preset event generated in at least one device, which is received from the first communication unit 111, to the user terminal apparatus 200, and control a state of the at least one device according to a control signal received from the user terminal apparatus 200 or 210.

Specifically, the controller 130 may generate the control signal for controlling the at least one device based on a user command received from the user terminal apparatus 200 or 210, and transmit the generated control signal to the at least one device.

For example, when an event in which water boils over in a gas range occurs, the event is sensed, and information for the event is received from the first communication unit 111, the controller 130 may generate a control signal for controlling the gas range to turn the page off through a UI screen provided by the user terminal apparatus 200 or 210, and transmit the generated control signal to the gas range.

Detailed description of an operation of the user terminal apparatus 200 or 210 and the UI screen will be described later with reference to the accompanying drawings.

Figure 3A:
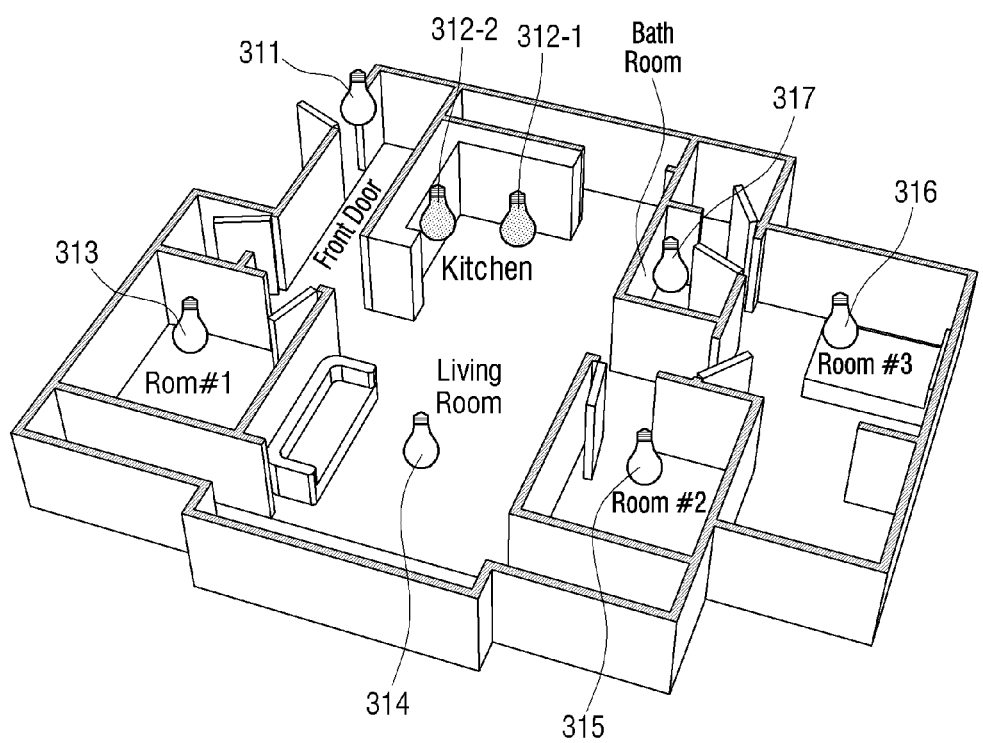
FIGS. 3A and 3B are views illustrating control methods of illumination devices according to various exemplary embodiments.
Figure 3B:
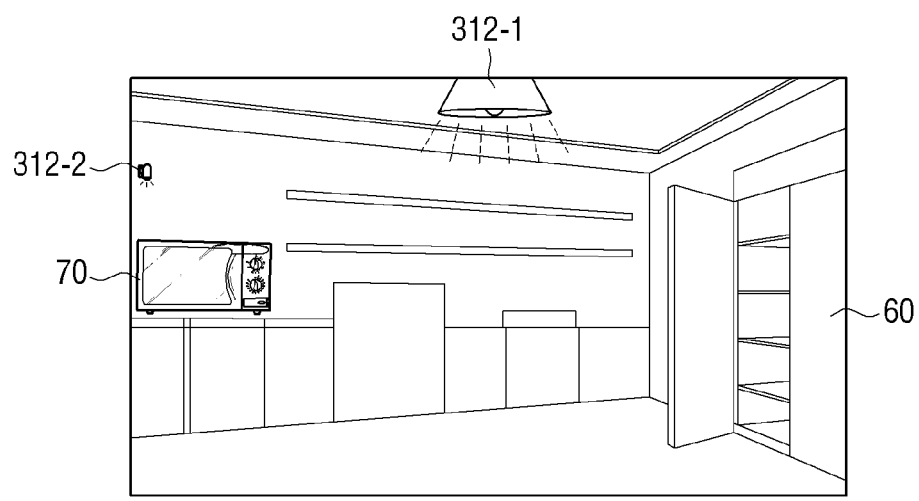

FIGS. 3A and 3B are views illustrating control methods of illumination devices according to various exemplary embodiments.

As illustrated in FIG. 3A, a plurality of illumination devices 311 to 317 may be disposed in spaces in a home.

In particular, two illumination devices, that is, a first illumination device 312-1 and a second illumination device 312-2 may be disposed in a kitchen space.

The control method will be described on the assumption that, as illustrated in FIG. 3B, two devices, for example, a refrigerator 60 and a microwave oven 70 are disposed in the kitchen space, and the first and second illumination devices 312-1 and 312-2 are disposed within preset distance ranges from the devices 60 and 70.

Figure 4A:
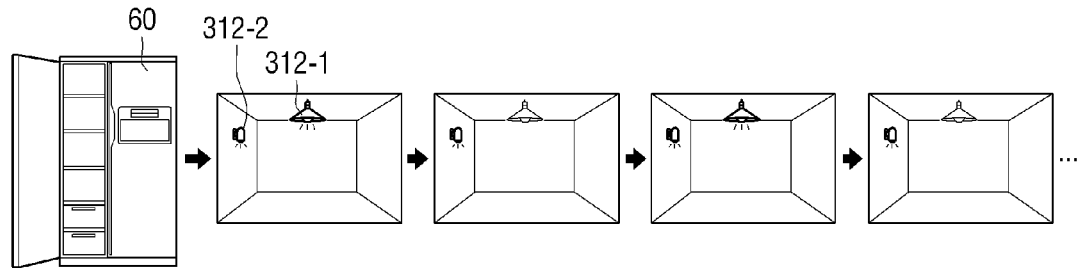
FIGS. 4A and 4B are views illustrating control methods of illumination devices according to an exemplary embodiment.
Figure 4B:
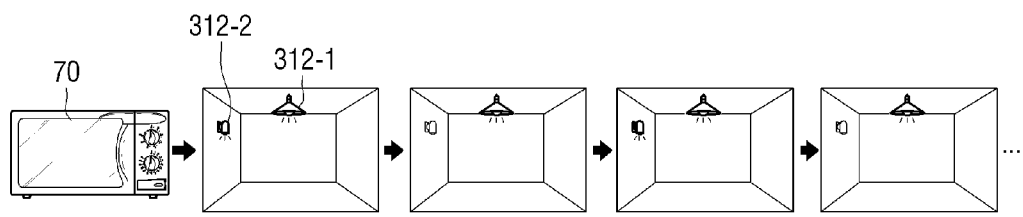

FIGS. 4A and 4B are views illustrating control methods of illumination devices according to an exemplary embodiment.

According to an exemplary embodiment, when a preset event occurs in the devices, the controller 130 may control light-emitting states of the illumination devices located within the preset distance ranges according to the devices.

For example, when an event in which a door of the refrigerator 60 is opened over a preset time occurs as illustrated in FIG. 4A, the controller 130 may control a light-emitting state of the first illumination device 312-1 located within the preset distance range from the refrigerator 60 to a specific light-emitting pattern.

When an operation of the microwave oven 70 is completed as illustrated in FIG. 4B, the controller 130 may control a light-emitting state of the second illumination device 312-2 located within the preset distance range from the microwave oven 70 to a specific light-emitting pattern.

Therefore, the user may identify whether a specific event occurs in which device according to a location of an illumination device of which a light-emitting pattern is controlled.

Figure 5A:
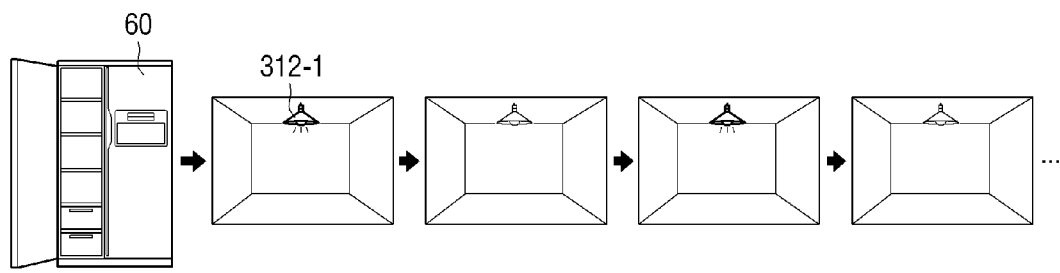
FIGS. 5A and 5B are views illustrating control methods of an illumination device according to another exemplary embodiment.
Figure 5B:
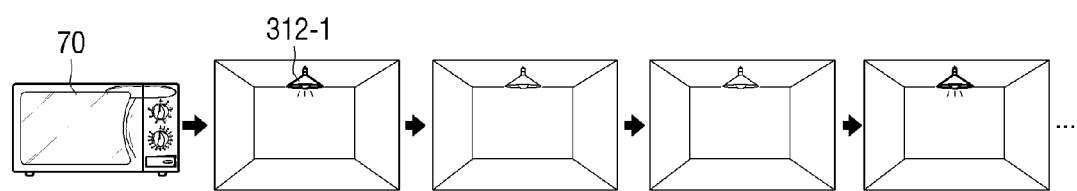

FIGS. 5A and 5B are views illustrating control methods of an illumination device according to another exemplary embodiment.

According to an exemplary embodiment, when preset events occur in devices, light-emitting states of the illumination device may be differently controlled according to the devices.

For example, when an event in which a door of the refrigerator 60 is open longer than a preset time occurs as illustrated in FIG. 5A, the controller 130 may control a light-emitting state of the illumination device 312-1 located within a preset distance range from the refrigerator 60 to produce a first light-emitting pattern. As an example, the first light-emitting pattern may be a pattern in which the illumination device 312-1 flickers at two hour intervals (every other hour).

Further, when an event in which an operation of the microwave oven 70 is completed occurs as illustrated in FIG. 5B, the controller 130 may control a light-emitting state of the illumination device 312-1 located within a preset distance range from the microwave oven 70 to a second light-emitting pattern. As an example, the second light-emitting pattern may be a pattern in which the illumination device 312-1 flickers at one hour intervals (every hour).

Therefore, the user may identify whether a specific event occurs in a device through a device related light-emitting pattern.

Although not shown in drawings, in another exemplary embodiment, the network apparatus 100 may differently control the light-emitting state of the illumination device according to a state of at least one device.

Figure 6:
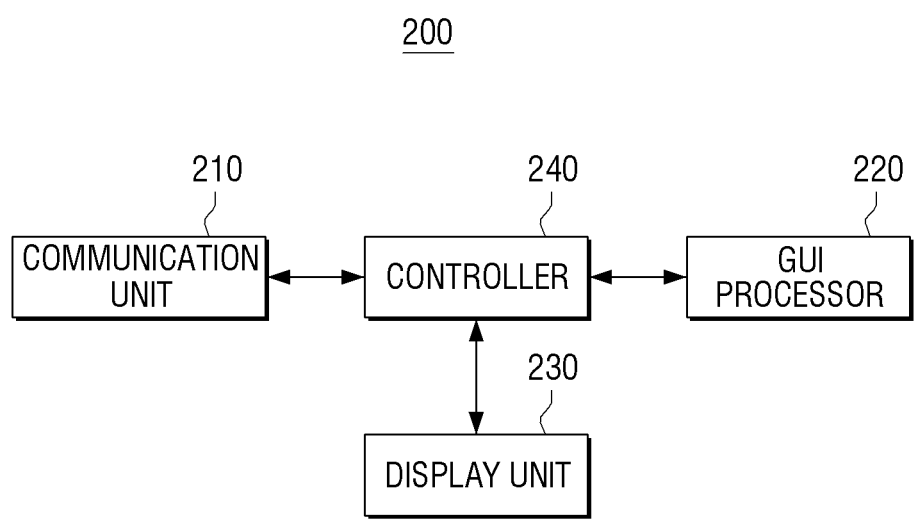
FIG. 6 is a block diagram illustrating a configuration of a user terminal apparatus according to another exemplary embodiment.

FIG. 6 is a block diagram illustrating a configuration of a user terminal apparatus according to another exemplary embodiment.

Referring to FIG. 6, the user terminal apparatus 200 includes a communication unit 210, a graphic user interface (GUI) processor 220, a display unit 230, and a controller 240.

The communication unit 210 may perform communication with the network apparatus 100. For example, the communication unit 210 may perform communication with the network apparatus 100 using a wired/wireless LAN, a WAN, Ethernet, Bluetooth, Zigbee, a USB, IEEE 1394 interface, WIFI, or power line communication (PLC). To this end, the communication unit 210 may include chips corresponding to communication methods or external input ports, or the like.

The communication unit 210 may receive information for a plurality of controllable devices from the network apparatus 100. For example, the communication unit 210 may receive a variety of information such as identification information, location information, function information, or the like of the plurality of devices.

The GUI processor 220 functions to generate a UI (User Interface) based on the information received from the network apparatus 100.

In particular, the GUI processor 220 may generate the UI for controlling the device based on the information received from the network apparatus 100.

At this time, the user terminal apparatus 200 may receive only information for each device configured to constitute the UI from the network apparatus 100, and generate the UI using a pre-stored UI format. In some cases, the user terminal apparatus 200 may also receive UI format information from the network apparatus 100.

The display unit 230 displays various screens. In particular, the display unit 230 may display the UI generated in the GUI processor 220. To this end, the display unit 230 may be implemented with a liquid crystal display (LCD) panel, an organic light-emitting diode (OLED), or the like, but is not limited thereto.

The display unit 230 may be implemented in a touch screen type which forms a mutual layer structure with a touch pad. At this time, the display unit 230 may be used as a user interface unit (not shown) configured to receive various user commands other than an output device. The touch screen may be configured to detect a touch input location and a touch input area as well as touch input pressure. At this time, the display unit 230 may receive a user command for macro activation or macro inactivation.

The controller 240 controls an overall operation of the user terminal apparatus 200.

Specifically, the controller 240 may control the GUI processor 220 and the display unit 230 to generate a UI including the information received from the network apparatus 100, and to display the generated UI.

When a user command for controlling a device on the UI is received, the controller 240 may generate a control signal corresponding to the received user command, and transmit the generated control signal to a corresponding device. Therefore, the user may check an event generated in a specific device notified through an illumination device, and perform control on the corresponding device through the UI through the user terminal apparatus 200.

Further, according to another exemplary embodiment, when an event signal, such as an abnormal operation of a specific device, is received from the network apparatus 100, the controller 240 may control information for the abnormal operation to be transmitted to an external server (not shown). At this time, the external server may store and manage information for a corresponding device, and in some cases, the external server may provide various services. For example, an A/S manager may provide information in which the user may directly fix a disordered apparatus, part replacement information, or the like to the user terminal apparatus 200 based on the stored information. Therefore, a user's burden of directly dropping by an A/S center may be reduced. Further, update of the device may be performed in the external server based on corresponding content. In addition, the external server may provide various services based on the corresponding content.

Figure 7:
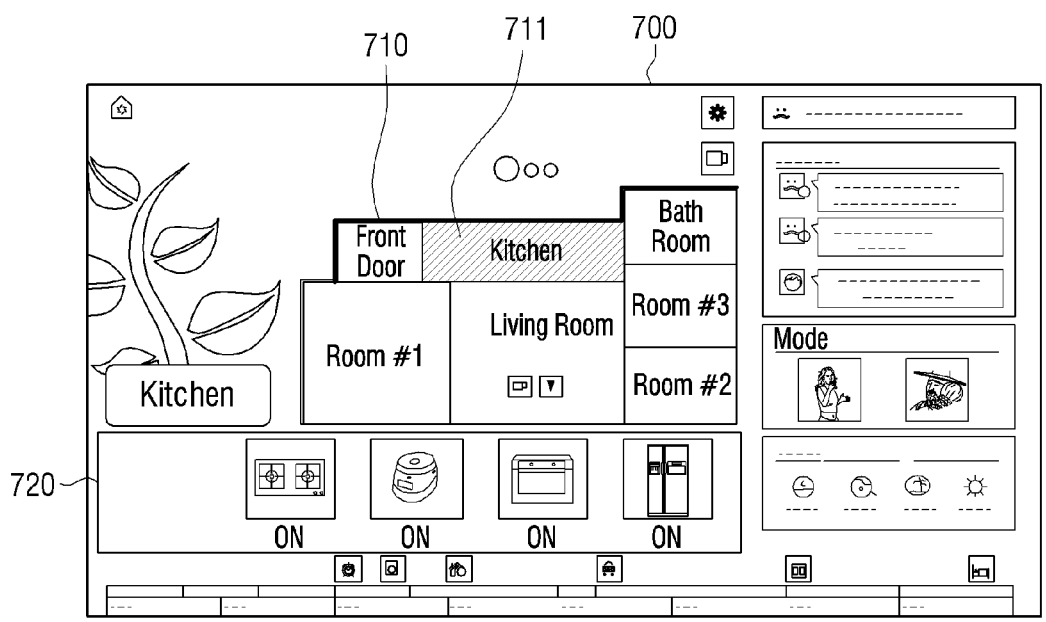
FIG. 7 is a view illustrating an example of a user interface (UI) screen displayed in a user terminal apparatus according to another exemplary embodiment.

FIG. 7 is a view illustrating an example of a UI screen displayed in a user terminal apparatus according to another exemplary embodiment.

As illustrated in FIG. 7, the user terminal apparatus 200 may provide a UI screen 700 configured to control devices in a network system.

The UI screen 700 provided in the user terminal apparatus 200 may provide an item 710 configured to represent a space arrangement structure in home, and an item 720 configured to represent current states or the like of home appliances provided in home.

When a kitchen space 711 is selected from the item 710 of the UI screen 700 configured to represent the space arrangement structure in home, current states of home appliances provided in the kitchen space may be provided in the item 720 configured to represent the current states or the like of the home appliances in home.

Therefore, when the user checks an event generated in a specific device based on a light-emitting state of an illumination device, the user may control an operation state of the device in which the event occurs through the UI screen 700 provided from the user terminal apparatus 200. For example, when the user checks an abnormal state of a gas range based on a light-emitting state of an illumination device located in a kitchen space, the user may control the gas range to turn the gas range off through the UI screen 700 provided from the user terminal apparatus 200 even when the user does not directly go to the kitchen space.

FIG. 8 is a flowchart illustrating a control method of a network apparatus according to an exemplary embodiment.

According to the control method of a network apparatus illustrated in FIG. 8, when a preset event occurs in at least one device (S810:Y), the network apparatus receives a signal for the preset event (S820). The network apparatus may be a home network apparatus configured to provide home network service, but is not limited thereto.

When the signal for the preset event is received, the network apparatus controls a light-emitting state of an illumination device located within a preset distance range from the at least one device based on information for the illumination device located within the preset distance range from the at least one device (S830).

In the operation S830 of controlling the light-emitting state of the illumination device, the network apparatus may differently control light-emitting states of illumination devices according to the at least one event.

In the operation S830 of controlling the light-emitting state of the illumination device, the network apparatus may differently control the light-emitting states of the illumination devices according to the at least one device.

Further, when the signal for the preset event is received, the network apparatus may transmit the information for the preset event to the user terminal apparatus, and control the state of the at least one device according to a control signal received from the user terminal apparatus.

According to the above-described the exemplary embodiment, convenience of the user may be improved by providing the information for the event generated in the device through the illumination device.

Merely, the above-described exemplary embodiments have described that the notification function is provided through a visual notification device such as an illumination device, but they may be applied to even a case in which the notification function is provided using various auditory notification devices such as a speaker.

A non-transitory computer-recordable medium or storage, in which a program sequentially performing the control method of a network apparatus according to the exemplary embodiment is stored, may be provided.

As an example, the non-transitory computer-recordable medium or storage, in which the program which performs the method of controlling a light-emitting state of an illumination device located within a preset distance range from at least one device based on information for the illumination device located within the preset distance range from the at least one device when a signal for a preset event generated in the at least one device is received, may be provided.

The non-transitory computer-recordable medium is not a medium or storage configured to temporarily store data such as a register, a cache, or a memory but an apparatus-readable medium configured to semi-permanently store data. Specifically, the above-described applications or programs may be stored in the non-transitory apparatus-readable medium such as a compact disc (CD), a DVD, a hard disc, a Blu-ray disc, a USB, a memory card, or a ROM, and provided.

Although buses are not illustrated in the block diagrams illustrating the network apparatus and the user terminal apparatus, communication between components may be performed through the buses. A processor configured to perform the above-described various operations, such as a central processing unit (CPU) or a microprocessor, may be further included in the network apparatus and the user terminal apparatus.

The foregoing exemplary embodiments and advantages are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A network apparatus, comprising:
   a communication unit configured to perform communication with at least one device and a user terminal apparatus configured to control the at least one device;
   a storage configured to store information for an illumination device located within a preset distance range of the at least one device; and
   a controller configured to control a light-emitting state of the illumination device located within the preset distance range of the at least one device based on the information stored in the storage when a preset event occurs in the at least one device,
   wherein the controller transmits information for the preset event to the user terminal apparatus, and controls a state of the at least one device according to a control signal received from the user terminal apparatus.

2. The network apparatus as claimed in claim 1, wherein the controller differently controls the light-emitting state of the illumination device according to the at least one device.

3. The network apparatus as claimed in claim 1, wherein the controller differently controls the light-emitting state of the illumination device according to a state of the at least one device.

4. The network apparatus as claimed in claim 1, further comprising a second communication unit configured to perform communication with a user terminal apparatus configured to control the at least one device.

5. The network apparatus as claimed in claim 1, wherein the network apparatus is a home network apparatus configured to provide home network service.

6. A method of controlling a network apparatus, the method comprising:
   receiving a signal for a preset event when the preset event occurs in at least one device; and
   controlling a light-emitting state of an illumination device located within a preset distance range of the at least one device based on information for the illumination device located within the preset distance range of the at least one device when the signal for the preset event is received,
   wherein the controlling transmits information for the preset event to a user terminal apparatus, and controls a state of the at least one device according to a control signal received from the user terminal apparatus.

7. The method as claimed in claim 6, wherein the controlling comprises differently controlling the light-emitting state of the illumination device according to the at least one device.

8. The method as claimed in claim 6, wherein the controlling comprises differently controlling the light-emitting state of the illumination device according to a state of the at least one device.

9. The method as claimed in claim 6, further comprising:
   transmitting information for the preset event to a user terminal apparatus when the signal for the preset event is received; and
   controlling a state of the at least one device according to a control signal received from the user terminal apparatus.

10. The method as claimed in claim 6, wherein the network apparatus is a home network apparatus configured to provide home network service.

11. A non-transitory computer readable storage storing a process, the process comprising:
    receiving a signal for a preset event when the preset event occurs in at least one device; and
    controlling a light-emitting state of an illumination device located within a preset distance range of the at least one device based on information for the illumination device located within the preset distance range of the at least one device when the signal for the preset event is received,
    wherein the controlling transmits information for the preset event to a user terminal apparatus, and controls a state of the at least one device according to a control signal received from the user terminal apparatus.

12. A method, comprising:
    detecting a device event of a device; and
    changing illumination associated with the device when the event is detected,
    wherein the changing transmits information for the event to a user terminal apparatus, and controls the device according to a control signal received from the user terminal apparatus.

13. A method as recited in claim 12, wherein the changing illumination is by a light source associated with the device at a time interval and in a pattern.

14. A method as recited in claim 13, wherein the pattern is associated with the event.

15. A method as recited in claim 12, wherein the illumination is by the light source associated with the device is a light closest to the device.

16. A method as recited in claim 12, further comprising allowing a user through a user apparatus to control the device.

17. A method as recited in claim 12, wherein the device is a home apparatus that produces event signals transmitted over a home network.

18. A method, comprising:
    detecting a device event of a device;
    alerting a user via a change in illumination associated with the device when the event is detected; and
    allowing the user to control the device via a portable handheld user terminal when the user is alerted.

19. A method as recited in claim 18, further comprising:
    displaying a graphical user interface on the portable handheld terminal depicting a layout of a physical space and status of devices within the space; and
    allowing the user to initiate a change of state of the device through the interface.

* * * * *